US006721021B2

United States Patent
Sakamoto et al.

(10) Patent No.: US 6,721,021 B2
(45) Date of Patent: Apr. 13, 2004

(54) LIQUID CRYSTAL DISPLAY DEVICE HAVING A BACK FRAME WHICH INCLUDES A CONTACTED PORTION WITH THE LIQUID CRYSTAL PANEL

(75) Inventors: Takuya Sakamoto, Kumamoto (JP); Hiroshige Hayasaki, Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 0 days.

(21) Appl. No.: 10/228,092

(22) Filed: Aug. 27, 2002

(65) Prior Publication Data

US 2002/0196384 A1 Dec. 26, 2002

Related U.S. Application Data

(62) Division of application No. 09/610,653, filed on Jul. 5, 2000, now Pat. No. 6,445,430.

(30) Foreign Application Priority Data

Jul. 5, 1999  (JP) .......................... 11-190090
Jun. 30, 2000 (JP) .......................... 2000-199600

(51) Int. Cl.[7] ............. G02F 1/1333; G02F 1/1335; F21V 7/04
(52) U.S. Cl. ............... 349/58; 349/62; 349/65; 362/31
(58) Field of Search .................. 349/58, 62, 63, 349/65, 113; 362/31, 84, 216, 561

(56) References Cited

U.S. PATENT DOCUMENTS

| | | | |
|---|---|---|---|
| 5,280,372 A | 1/1994 | Horiuchi | 349/65 |
| 5,442,470 A * | 8/1995 | Hashimoto | 349/58 |
| 5,815,227 A | 9/1998 | Lee | 349/67 |
| 5,966,191 A * | 10/1999 | Lee | 349/58 |
| 6,016,175 A * | 1/2000 | Kim | 349/58 |
| 6,064,455 A * | 5/2000 | Kim | 349/113 |
| 6,490,016 B1 * | 12/2002 | Koura | 349/58 |

FOREIGN PATENT DOCUMENTS

| | | | |
|---|---|---|---|
| JP | 4-146477 | | 5/1992 |
| JP | 6-82782 | | 3/1994 |
| JP | 06-082782 | * | 3/1994 |
| JP | 8-152624 | | 6/1996 |
| JP | 8-262414 | | 10/1996 |
| JP | 9-197383 | | 7/1997 |
| JP | 9-211430 | | 8/1997 |
| JP | 10-312161 | | 11/1998 |
| JP | 10-319378 | | 12/1998 |
| JP | 11-101963 | | 4/1999 |
| JP | 11-271719 | | 10/1999 |
| JP | 2001-13886 | | 1/2001 |

* cited by examiner

*Primary Examiner*—Tarifur R. Chowdhury
(74) *Attorney, Agent, or Firm*—McDermott, Will & Emery

(57) ABSTRACT

A liquid crystal display device is constructed by arranging, on the back of a liquid crystal panel 1 for displaying an image, an optical guide plate unit 5 constructed to irradiate the whole surface of the liquid crystal panel 1 with a light coming from a lamp unit 2 and reflected by a lamp reflector 3; by positioning the liquid crystal panel 1 in contact with a liquid crystal panel receiving portion 8 which is rounded by folding back a lamp cover 4 constructed to cover the lamp unit 2; and by supporting and fixing the liquid crystal panel 1 and the optical guide plate unit 5 by a front frame 7 and a back frame 6.

12 Claims, 11 Drawing Sheets

LIQUID CRYSTAL DISPLAY DEVICE HAVING A BACK FRAME WHICH INCLUDES A CONTACTED PORTION WITH THE LIQUID CRYSTAL PANEL

This application is a divisional of U.S. patent application Ser. No. 09/610,653 filed Jul. 5, 2000 now U.S. Pat. No. 6,445,430.

BACKGROUND OF THE INVENTION

1. Field of the Invention

The present invention relates to a liquid crystal display device which is enabled to position a liquid crystal panel properly when assembled.

2. Prior Art

In a liquid crystal display device provided with a lamp cover, the liquid crystal panel is positioned with a lamp cover or a back frame. When this liquid crystal display device is to be assembled, the liquid crystal panel may ride on the panel receiving portion of the lamp cover so that the positioning is made impossible. With this ride, the liquid crystal panel may be chipped to raise a problem against the improvement in the production yield.

In the liquid crystal display device, on the other hand, the liquid crystal panel is positioned with a resin back frame. This positioning raises problems in the strength and the workability so that the narrow framing of the liquid crystal display device is restricted.

FIG. 20 is an exploded perspective view showing a construction of a liquid crystal display device of the prior art.

In FIG. 20: reference numeral 1 designates a liquid crystal panel equipped with a printed board of a liquid crystal driving circuit; numeral 2 a lamp unit acting as a light source for the liquid crystal panel 1; numeral a lamp reflector 3 constructed to reflect the light coming from the lamp unit 2; numeral 5 designates an optical guide plate unit arranged on the back of the liquid crystal panel 1 for guiding the light coming from the lamp unit 2 to the whole face of the liquid crystal panel 1; numeral 6 a resin back frame for supporting and fixing the liquid crystal panel 1 together with the lamp reflector 3 and the optical guide plate unit 5; and numeral 7 a front frame for fixing the back frame 6.

In this liquid crystal display device of the prior art thus constructed, the liquid crystal panel 1 is fixed by the panel receiving portion of the back frame acting as a lamp cover.

In the device of the prior art in which the liquid crystal panel is fixed by the panel receiving portion of the back frame 6, as described above, when the liquid crystal display device is to be assembled, the liquid crystal panel 1 rides on the panel receiving portion so that the positioning is made impossible or so that the liquid crystal panel 1 is chipped. This is the problem to be solved for improving the yield.

In the device of the prior art in which the liquid crystal panel is fixed by the panel receiving portion of the back frame 6, on the other hand, the problems in the strength and the workability occur when the liquid crystal display device is to be narrowly framed.

SUMMARY OF THE INVENTION

The invention has been conceived to solve the above-specified problems and has a first object to provide a liquid crystal display device which is enabled to position the liquid crystal panel while being freed from being chipped.

A second object of the invention is to provide a liquid crystal display device which has a structure capable of positioning the liquid crystal panel while being narrowly framed.

According to a first aspect of the invention, there is provided a liquid crystal display device comprising: a liquid crystal panel for displaying an image; a lamp unit for providing a light source for the liquid crystal panel; an optical guide plate unit arranged on the back of the liquid crystal panel for irradiating the liquid crystal panel with a light outputted from the lamp unit; a lamp cover covering the lamp unit and having a contacted portion with the liquid crystal panel; and a pair of frames constructed for supporting the optical guide plate unit and the liquid crystal panel, wherein the contacted portion of the lamp cover with the liquid crystal panel is curved.

On the other hand, the contacted portion of the lamp cover with the liquid crystal panel is arranged to position the liquid crystal, panel.

On the other hand, the contacted portion of the lamp cover with the liquid crystal panel is curved by folding back the lamp cover.

According to another aspect of the invention, there is provided a liquid crystal display device comprising: a liquid crystal panel for displaying an image; a lamp unit for providing a light source for the liquid crystal panel; an optical guide plate unit arranged on the back of the liquid crystal panel for irradiating the liquid crystal panel with a light outputted from the lamp unit; a back frame constructed to support the optical guide plate unit and to cover the lamp unit and having a contacted portion with the liquid crystal panel; and a front frame constructed to support the liquid crystal panel, wherein the contacted portion of the back frame with the liquid crystal panel is curved.

On the other hand, the contacted portion of the back frame with the liquid crystal panel is arranged to position the liquid crystal panel.

According to still another aspect of the invention, there is provided a liquid crystal display device comprising: a liquid crystal panel for displaying an image; a lamp unit for providing a light source for the liquid crystal panel; an optical guide plate unit arranged on the back of the liquid crystal panel for irradiating the liquid crystal panel with a light outputted from the lamp unit; a lamp cover covering the lamp unit and having a contacted portion with the liquid crystal panel; and a pair of frames constructed for supporting the optical guide plate unit and the liquid crystal panel, wherein the contacted portion of the lamp cover with the liquid crystal panel is formed by folding back the lamp cover.

On the other hand, the contacted portion of the lamp cover with the liquid crystal panel is arranged to position the liquid crystal panel.

On the other hand, the contacted portion of the lamp cover with the liquid crystal panel is curved.

Moreover, the contacted portion of the lamp cover with the liquid crystal panel is formed by folding back the lamp cover at an angle over 90 degrees.

On the other hand, the contacted portion of the lamp cover with the liquid crystal panel is formed by folding back the lamp cover stepwise.

On the other hand, the contacted portion of the lamp cover with the liquid crystal panel is formed by folding the lamp cover at a right angle.

According to a further aspect of the invention, there is provided a liquid crystal display device comprising: a liquid crystal panel for displaying an image; a lamp unit for providing a light source for the liquid crystal panel; an optical guide plate unit arranged on the back of the liquid crystal panel for irradiating the liquid crystal panel with a light outputted from the lamp unit; a lamp reflector arranged to reflect the light of the lamp unit and having a contacted portion with the liquid crystal panel; and a pair of frames constructed for supporting the optical guide plate unit and the liquid crystal panel, wherein the contacted portion of the lamp reflector with the liquid crystal panel is formed by folding back the lamp reflector.

On the other hand, the contacted portion of the lamp reflector with the liquid crystal panel is arranged to position the liquid crystal panel.

On the other hand, the contacted portion of the lamp reflector with the liquid crystal panel is curved.

In addition, the contacted portion of the lamp reflector with the liquid crystal panel is formed by folding back the lamp reflector at an angle over 90 degrees.

On the other hand, the contacted portion of the lamp reflector with the liquid crystal panel is formed by folding back the lamp reflected stepwise.

On the other hand, the contacted portion of the lamp reflector with the liquid crystal panel is formed by folding the lamp reflector at a right angle.

According to a further aspect of the invention, there is provided a liquid crystal display device comprising: a liquid crystal panel for displaying an image; a lamp unit for providing a light source for the liquid crystal panel; an optical guide plate unit arranged on the back of the liquid crystal panel for irradiating the liquid crystal panel with a light outputted from the lamp unit; a back frame constructed to support the optical guide plate unit and to cover the lamp unit and having a contacted portion with the liquid crystal panel; and a front frame constructed to support the liquid crystal panel, wherein the contacted portion of the back frame with the liquid crystal panel is formed by folding back the back frame.

On the other hand, the contacted portion of the back frame with the liquid crystal panel is arranged to position the liquid crystal panel.

On the other hand, the contacted portion of the back frame with the liquid crystal panel is curved.

On the other hand, moreover, the contacted portion of the back frame with the liquid crystal panel is formed by folding back the back frame at an angle over 90 degrees.

On the other hand, the contacted portion of the back frame with the liquid crystal panel is formed by folding back the back frame stepwise.

On the other hand, the contacted portion of the back frame with the liquid crystal panel is formed by folding the back frame at a right angle.

DESCRIPTION OF THE PREFERRED EMBODIMENTS

Embodiment 1

Embodiment 1 of the invention will be described with reference to the accompanying drawings.

Figure 1:
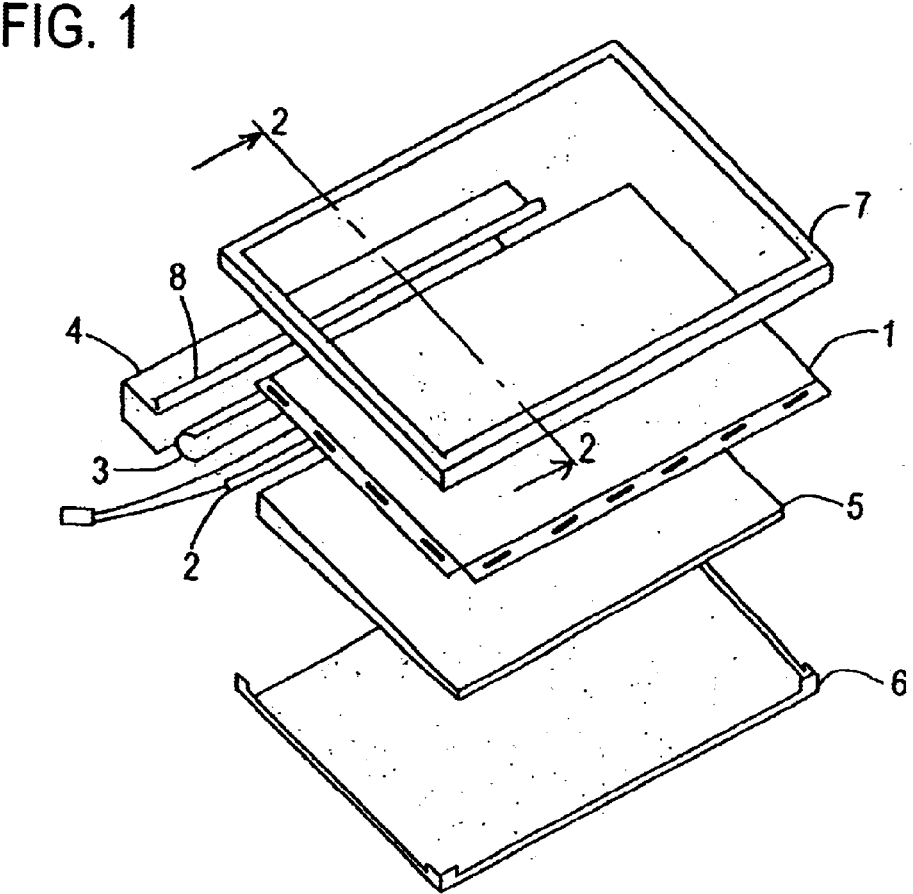
FIG. 1 is an exploded perspective view showing constructions of liquid crystal display devices according to Embodiments 1 and 4 of the invention.

FIG. 1 is an exploded perspective view showing a construction of a liquid crystal display device according to Embodiment 1 of the invention.

Figure 2:
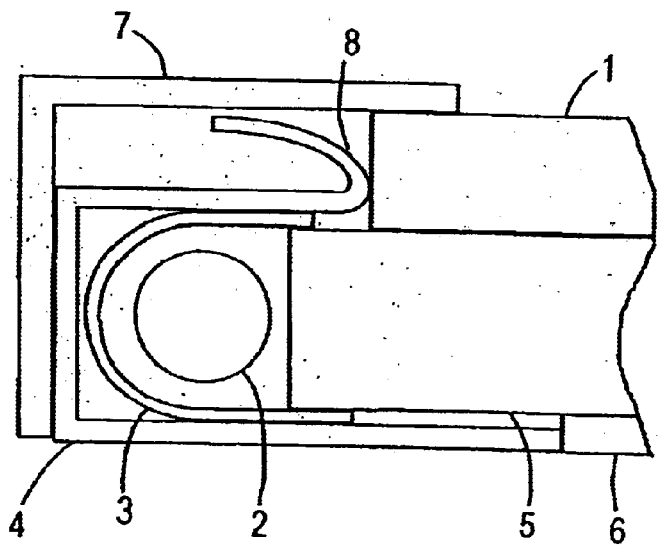
FIG. 2 is an enlarged view showing the liquid crystal display devices according to Embodiments 1 and 4 of the invention.

FIG. 2 is a section taken along arrows B—B of FIG. 1. In these Figures: reference numeral 1 designates a liquid crystal panel equipped with a printed board of a liquid crystal driving circuit for displaying an image; numeral 2 a lamp unit acting as a light source for the liquid crystal panel 1; numeral 3 a lamp reflector constructed to reflect the light coming from the lamp unit 2; and numeral 4 a lamp cover for covering the lamp reflector 3 from the outside.

Numeral 5 designates an optical guide plate unit arranged on the back of the liquid crystal panel 1 for irradiating the whole face of the liquid crystal panel 1 homogeneously with the light coming from the lamp unit 2; numeral 6 a back frame for supporting and fixing the lamp cover 4 and the optical guide plate unit 5; and numeral 7 a front frame for supporting the liquid crystal panel 1 and the lamp cover 4 and fixing the lamp reflector 3, the lamp unit 2 and the optical guide plate unit 5 together with the back frame 6. Numeral 8 designates a liquid crystal panel receiving portion which is so folded back from the liquid crystal panel contacted portion of the lamp cover 4 that it is rounded at the folded portion to form a positioning portion for the liquid crystal panel 1.

In the liquid crystal display device thus constructed, the liquid crystal panel 1 equipped with the liquid crystal driving printed board is supported and fixed by the lamp cover 4 and the front frame 7. The optical guide plate unit 5 is supported and fixed by the back frame 6. The lamp unit 2 is supported in a covered manner by the lamp reflector 3. This lamp reflector 3 is attached to the optical guide plate unit 5 and is supported by the lamp cover 4. This lamp cover 4 is provided with the liquid crystal panel receiving portion 8 which is folded back in the rounded manner from the contacted face with the liquid crystal panel 1.

Thus according to Embodiment 1, the lamp cover 4 is equipped with the liquid crystal panel receiving portion 8. As a result, even if the liquid crystal panel 1 rides, when assembled, on the liquid crystal panel receiving portion 8, it can be fixed in position while suppressing itself from being chipped.

Embodiment 2

Figure 3:
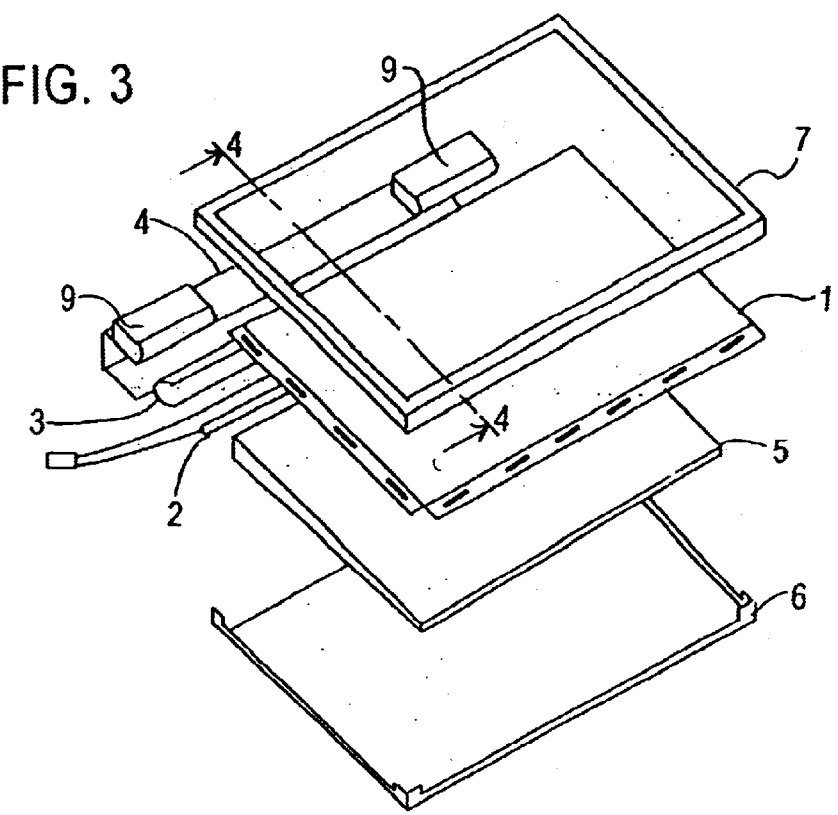
FIG. 3 is an exploded perspective view showing a construction of a liquid crystal display device according to Embodiment 2 of the invention.

FIG. 3 is an exploded perspective view showing a construction of a liquid crystal display device according to Embodiment 2 of the invention.

Figure 4:
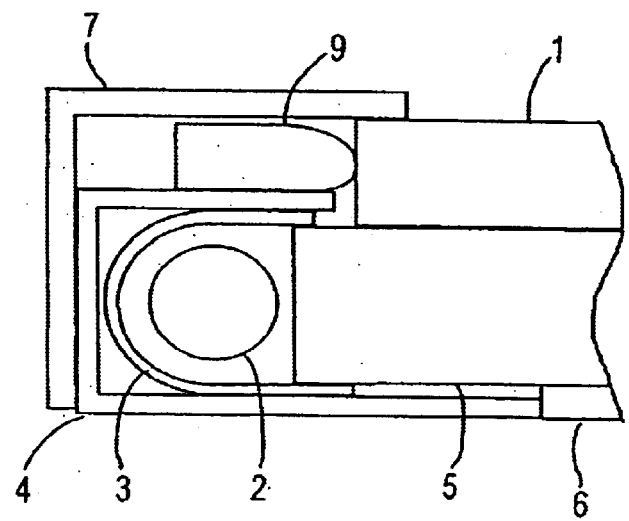
FIG. 4 is a sectional view showing the liquid crystal display device according to Embodiment 2 of the invention.

FIG. 4 is a section taken along arrows C—C of FIG. 3. In these Figures, the components 1 to 7 are identical to those of FIG. 1, but only the construction of the lamp cover 4 is different from that of FIG. 1. Reference numeral 9 designates a liquid crystal panel receiving portion which is disposed at a contacted portion of the lamp cover 4 with the liquid crystal panel 1 to form a positioning portion for the liquid crystal panel 1. This liquid crystal panel receiving portion 9 is rounded at its face and contacted with the liquid crystal panel 1.

In the liquid crystal display device thus constructed, the liquid crystal panel 1 equipped with the liquid crystal driving printed board is supported and fixed by the lamp cover 4 and the front frame 7. The optical guide plate unit 5 is supported and fixed by the back frame 6. The lamp unit 2 is supported in a covered manner by the lamp reflector 3. This lamp reflector 3 is attached to the optical guide plate unit 5 and is supported by the lamp cover 4. This lamp cover 4 is provided with the rounded liquid crystal panel receiving portion 9 as the contacted portion with the liquid crystal panel 1.

Thus according to Embodiment 2, the lamp cover 4 is equipped with the liquid crystal panel receiving portion 9. As a result, even if the liquid crystal panel 1 rides, when assembled, on the liquid crystal panel receiving portion 9, it can be fixed in position while suppressing itself from being chipped.

Embodiment 3

Figure 5:
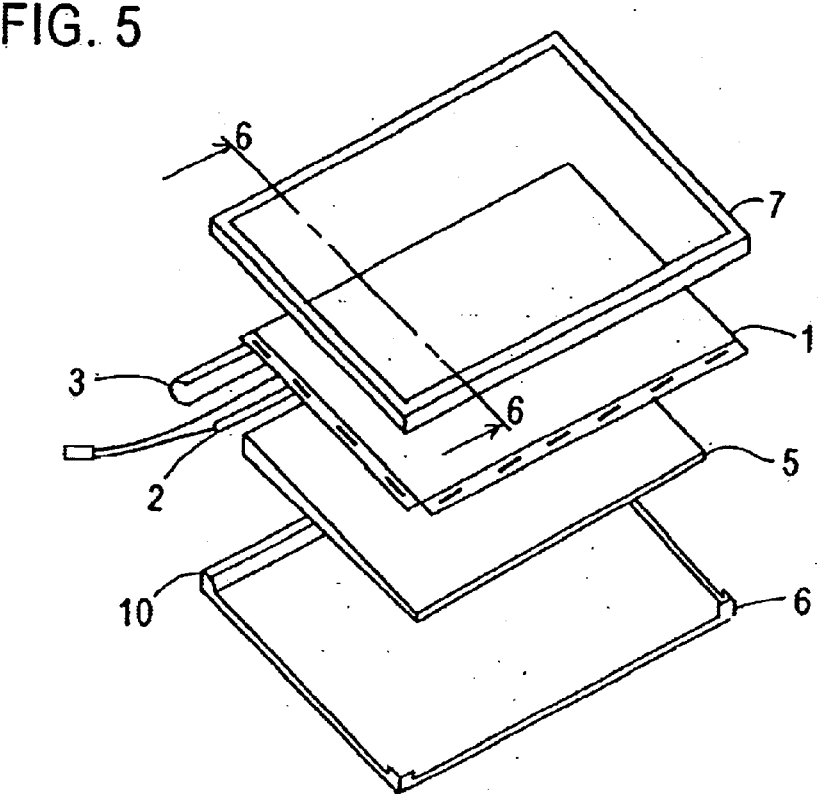
FIG. 5 is an exploded perspective view showing a construction of a liquid crystal display device according to Embodiment 3 of the invention.

FIG. 5 is an exploded perspective view showing a construction of a liquid crystal display device according to Embodiment 3 of the invention.

Figure 6:
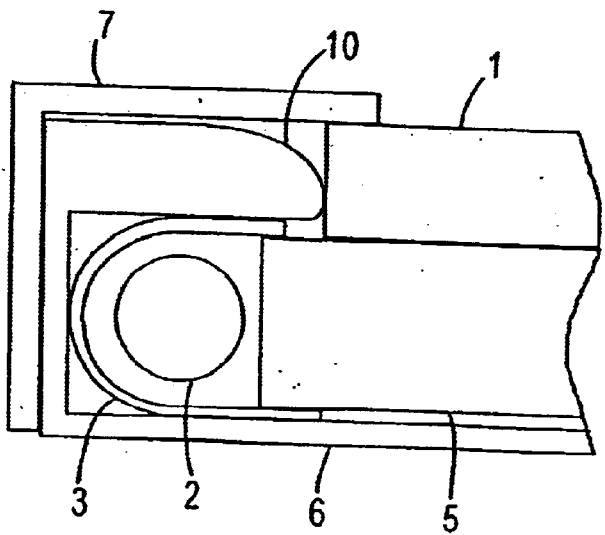
FIG. 6 is a sectional view showing the liquid crystal display device according to Embodiment 3 of the invention.

FIG. 6 is a section taken along arrows D—D of FIG. 5.

In these Figures, the components 1 to 3 and 5 to 7 are identical to those of FIG. 1, but the back frame 6 is constructed to act as the lamp cover 4 of FIG. 1 and to cover the lamp reflector 3. Reference numeral 10 designates a liquid crystal panel receiving portion which forms a contacted portion as the positioning portion of the back frame 6 with the liquid crystal panel 1 which is rounded at the contacted portion with the liquid crystal panel 1 to form a round face.

In the liquid crystal display device thus constructed, the liquid crystal panel 1 equipped with the liquid crystal driving printed board is supported and fixed by the front frame 7. The optical guide plate unit 5 is supported and fixed by the back frame 6. The lamp unit 2 is supported in a covered manner by the lamp reflector 3. This lamp reflector 3 is attached to the optical guide plate unit 5 and is covered with and supported by the back frame 6.

This back frame 6 is provided with the liquid crystal panel receiving portion 10 which is rounded as the positioning portion for the liquid crystal panel 1.

Thus according to Embodiment 3, the back frame 6 acting as the lamp cover is equipped with the liquid crystal panel receiving portion 10. As a result, even if the liquid crystal panel 1 rides, when assembled, on the liquid crystal panel receiving portion 10, it can be fixed in position while suppressing itself from being chipped.

Embodiment 4

Next, Embodiment 4 of the invention will be described with reference to the accompanying drawings.

The fundamental construction of Embodiment 4 is similar to that of Embodiment 1, and the lamp cover is provided with the liquid crystal panel receiving portion. This liquid crystal panel receiving portion will be described with additional reference to FIGS. 1 and 2 and in connection with liquid crystal panel receiving portions of different structures with reference to FIGS. 7 to 9.

In FIGS. 1 and 2, the liquid crystal panel receiving portion 8 of the lamp cover 4 forms the positioning portion for the liquid crystal panel 1. In this positioning portion, the liquid crystal panel receiving portion 8 is folded back at an angle over 90 degrees and rounded at the contacted portion.

In the liquid crystal display device thus constructed, the lamp cover 4 is provided with the liquid crystal panel receiving portion 8. The liquid crystal panel 1 is contacted, when assembled, with the liquid crystal panel receiving portion 8 so that it can be fixed precisely in position while being narrowly framed.

Figure 7:
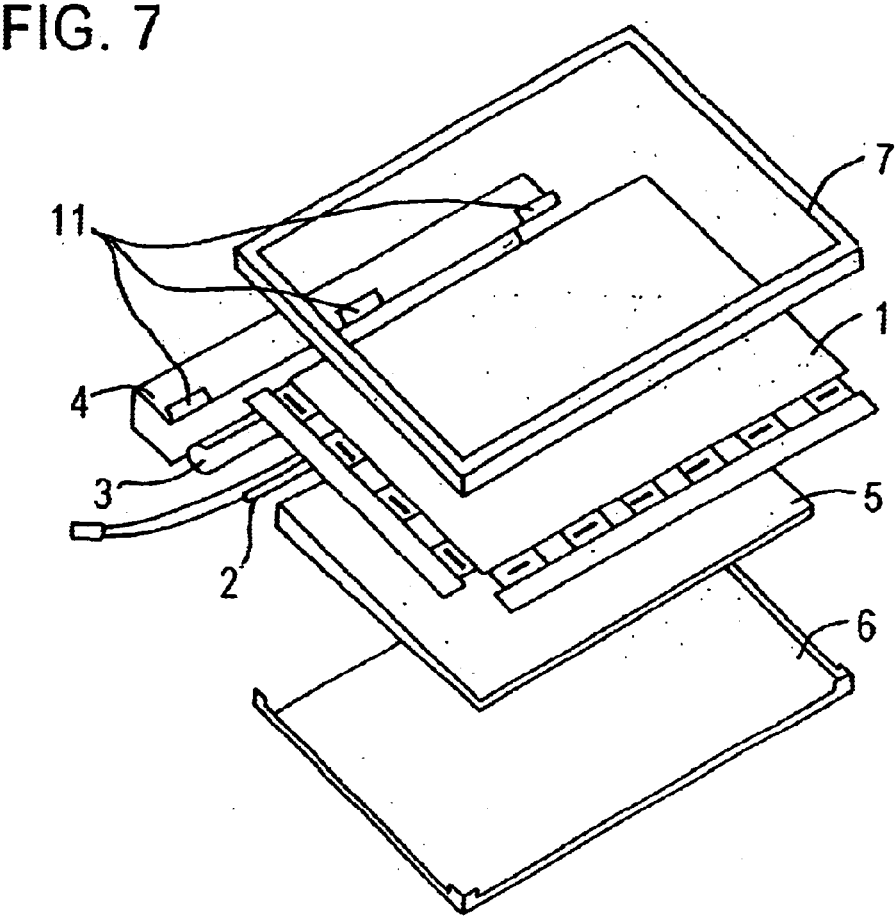
FIG. 7 is an exploded perspective view showing a liquid crystal display device according to Embodiment 4 of the invention.

FIG. 7 is an exploded perspective view showing a liquid crystal display device according to Embodiment 4 of the invention.

In FIG. 7, the components 1 to 7 are identical to those of FIG. 1. Reference numeral 11 designates a liquid crystal panel receiving portion which is so provided on the lamp cover 4 as is contacted partially with the liquid crystal panel 1.

Figure 8:
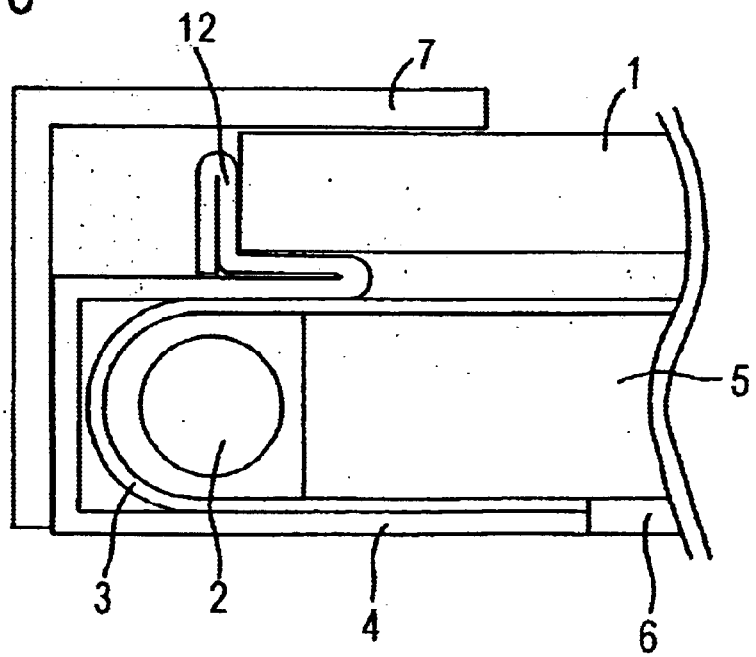
FIG. 8 is an enlarged view showing a liquid crystal display device according to Embodiment 4 of the invention.

FIG. 8 is an enlarged view showing a liquid crystal display device according to Embodiment 4 of the invention.

In FIG. 8 the components 1 to 7 are identical to those of FIG. 2. Reference numeral 12 designates such a liquid crystal panel receiving portion of the lamp cover 4 as has a stepwise folded portion.

Figure 9:
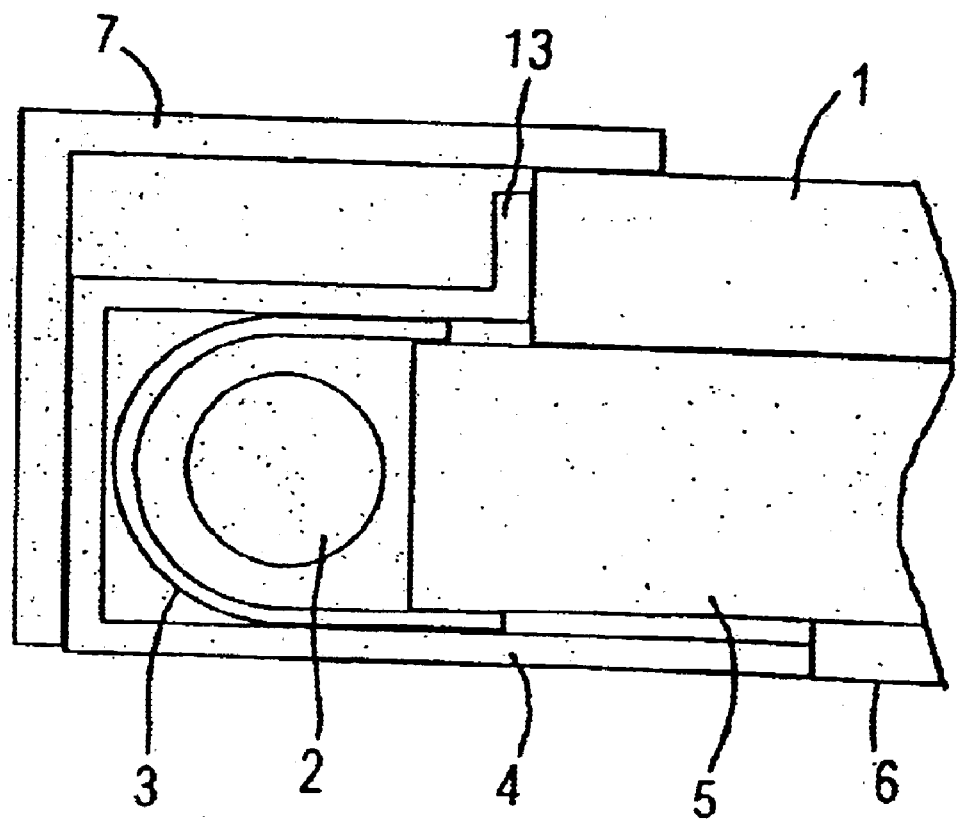
FIG. 9 is an enlarged view showing a liquid crystal display device according to Embodiment 4 of the invention.

FIG. 9 is an enlarged view showing a liquid crystal display device according to Embodiment 4 of the invention.

In FIG. 9 the components 1 to 7 are identical to those of FIG. 2. Reference numeral 13 designates such a liquid crystal panel receiving portion of the lamp cover 4 as is folded at a right angle.

In FIG. 1, the liquid crystal panel 1 is fixed all over its one side by the liquid crystal panel receiving portion 8. As shown in FIG. 7, however, the liquid crystal panel 1 can be contacted partially with and fixed by at least one liquid crystal panel receiving portion 11.

In FIG. 1, on the other hand, there is provided the liquid crystal panel receiving portion 8 in which the folded-back portion of the lamp cover 4 is used as the contacted portion with the liquid crystal panel 1. As shown in FIG. 8, however, the folded-back portion of the liquid crystal panel receiving portion 12 is formed stepwise so that it can retain the strength while framing the liquid crystal panel 1 narrowly.

In FIG. 1, on the other hand, there is provided the liquid crystal panel receiving portion 8 in which the folded-back portion of the lamp cover 4 is used as the contacted portion with the liquid crystal panel 1. As shown in FIG. 9, however, the folded-back portion of the liquid crystal panel receiving portion 13 can be folded at a right angle.

By providing the lamp cover 4 with the liquid crystal panel receiving portion, according to Embodiment 4, the liquid crystal panel 1 can be fixed precisely in position while being narrowly framed.

Embodiment 5

Next, Embodiment 5 of the invention will be described with reference to the accompanying drawings.

Figure 10:
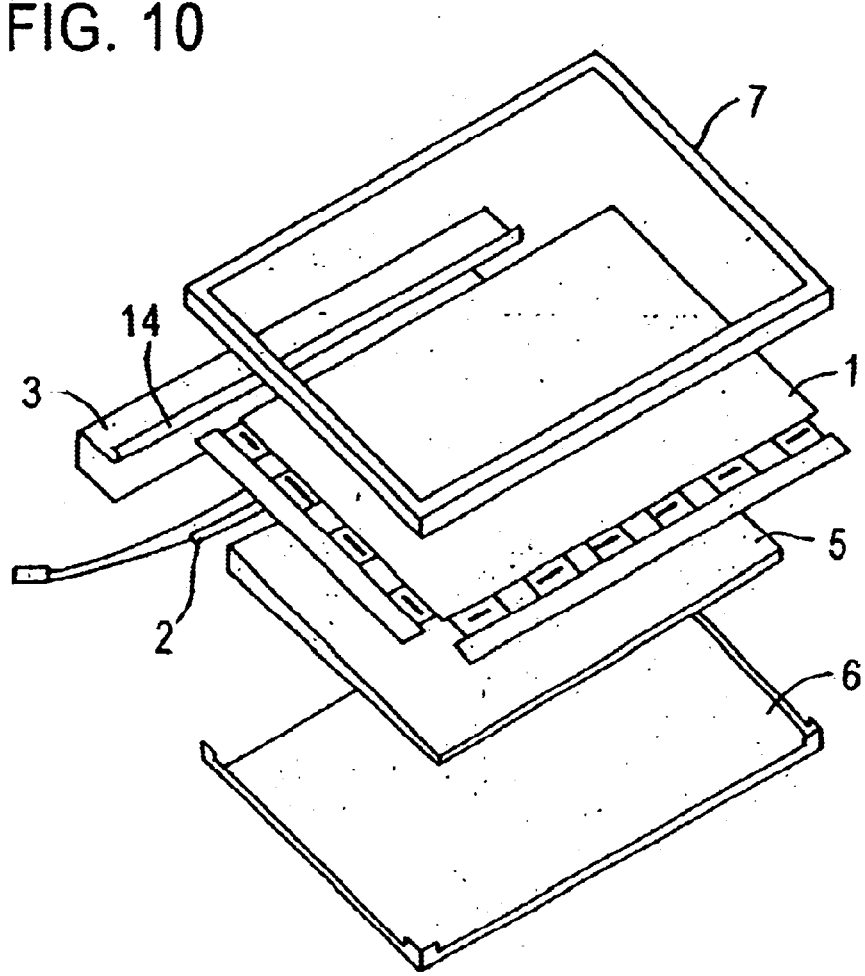
FIG. 10 is an exploded perspective view showing a construction of a liquid crystal display device according to Embodiment 5 of the invention.

FIG. 10 is an exploded perspective view showing a constitution of a liquid crystal display device according to Embodiment 5 of the invention.

Figure 11:
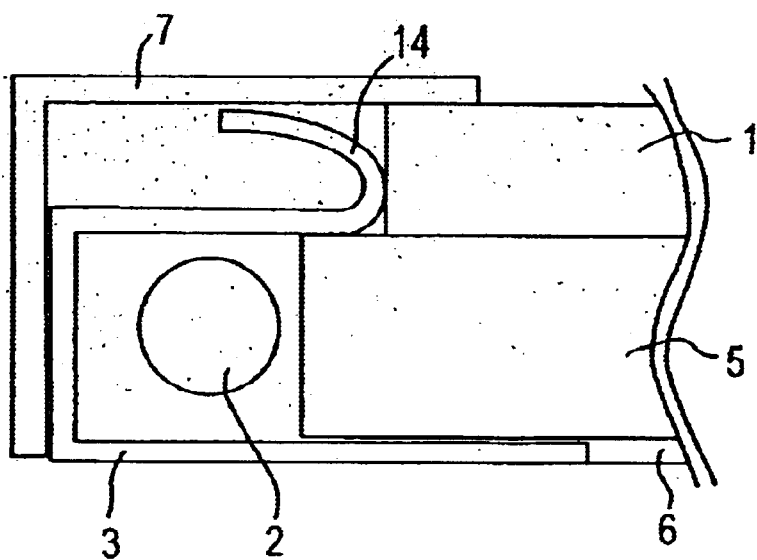
FIG. 11 is an enlarged view showing the liquid crystal display device according to Embodiment 5 of the invention.

FIG. 11 is an enlarged view of FIG. 10.

In FIGS. 10 and 11: reference numeral 1 designates a liquid crystal panel equipped with a printed board of a liquid crystal driving circuit; numeral 2 a lamp unit acting as a light source for the liquid crystal panel 1; numeral 3 a lamp reflector constructed to reflect the light coming from the lamp unit 2; numeral 5 designates an optical guide plate unit arranged on the back of the liquid crystal panel 1 for guiding the light coming from the lamp unit 2 to the whole face of the liquid crystal panel 1; numeral 6 a back frame for supporting the liquid crystal panel 1 together with the lamp reflector 3 and the optical guide plate unit 5; and numeral 7 a front frame for fixing the back frame 6. Numeral 14 designates a liquid crystal panel receiving portion in which a folded-back portion formed by folding back the lamp reflector 3 is used as a contacted portion with the liquid crystal panel 1. This liquid crystal panel receiving portion 14 forms the positioning portion for the liquid crystal panel 1. Here, the folded-back portion of the liquid crystal panel receiving portion 14 may be folded back at an angle over 90 degrees and rounded at the contacted portion.

In the liquid crystal display device thus constructed, the liquid crystal panel 1 equipped with the liquid crystal driving printed board and the optical guide plate unit 5 are supported and fixed by the back frame 6. The lamp unit 2 is supported in a covered manner by the lamp reflector 3. This lamp reflector 3 is provided with the liquid crystal panel receiving portion 14 which has the folded-back portion folded-back from the lamp reflector 3 and which is bent at its upper portion backward of the direction for the liquid crystal panel 1 to be arranged.

In the liquid crystal display device shown in FIG. 11, the lamp reflector 3 is provided with the liquid crystal panel receiving portion 14 so that the liquid crystal panel 1 can be fixed precisely in position while being narrowly framed.

Figure 12:
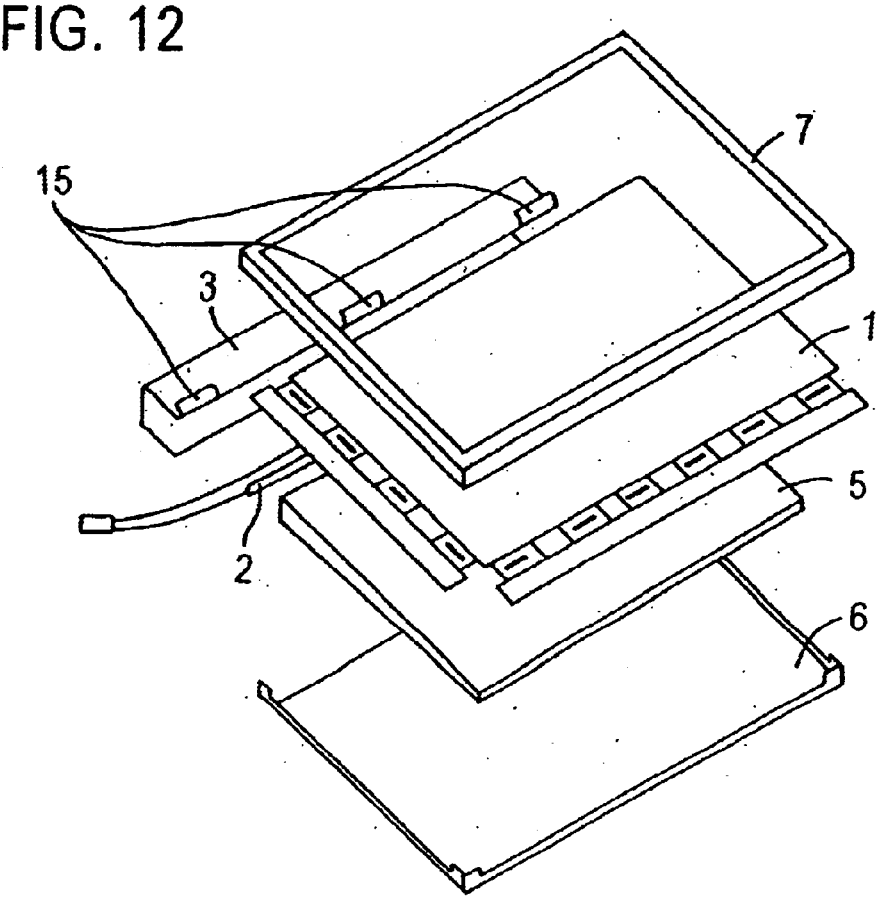
FIG. 12 is an exploded perspective view showing a liquid crystal display device according to Embodiment 5 of the invention.

FIG. 12 is an exploded perspective view showing a liquid crystal display device according to Embodiment 5 of the invention.

In FIG. 12, the components 1 to 3 and 5 to 7 are identical to those of FIG. 10. Reference numeral 15 designates a liquid crystal panel receiving portion which is so provided on the lamp reflector 3 as is contacted partially with the liquid crystal panel 1.

Figure 13:
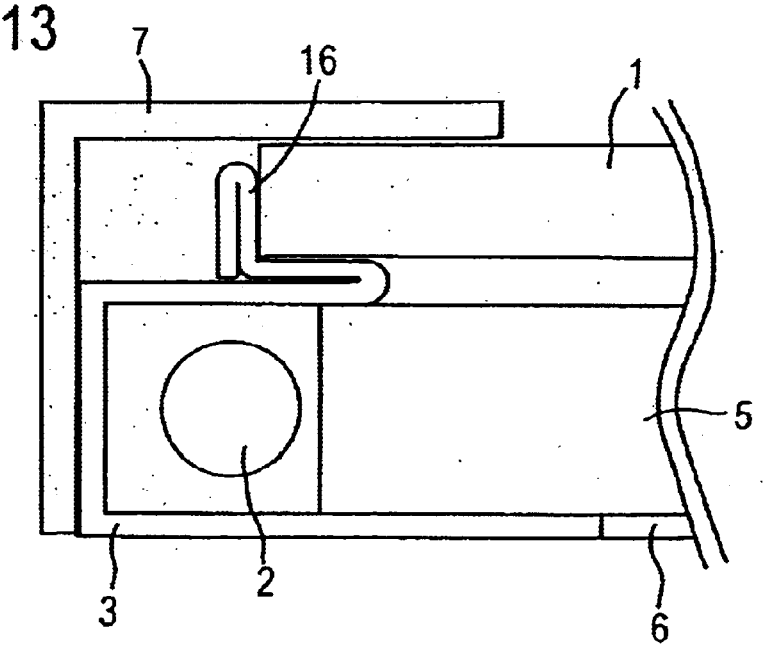
FIG. 13 is an enlarged view showing a liquid crystal display device according to Embodiment 5 of the invention.

FIG. 13 is an enlarged view showing a liquid crystal display device according to Embodiment 5 of the invention.

In FIG. 13, the components 1 to 3 and 5 to 7 are identical to those of FIG. 11. Reference numeral 16 designates such a liquid crystal panel receiving portion of the lamp reflector 3 as has a stepwise folded-back portion.

Figure 14:
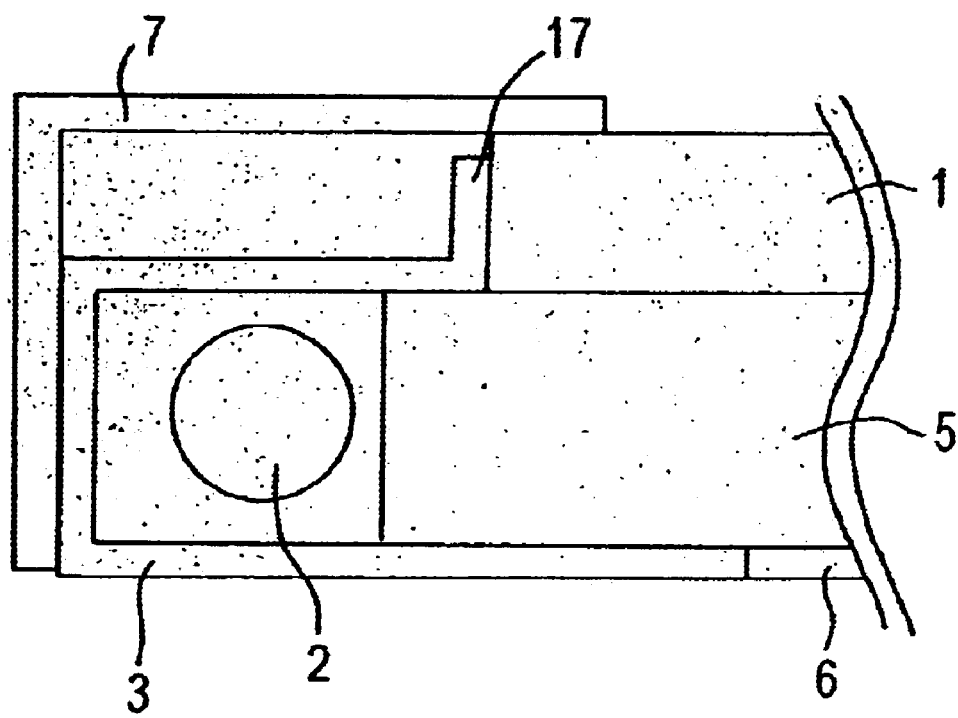
FIG. 14 is an enlarged view showing a liquid crystal display device according to Embodiment 5 of the invention.

FIG. 14 is an enlarged view showing a liquid crystal display device according to Embodiment 5 of the invention.

In FIG. 14, the components 1 to 3 and 5 to 7 are identical to those of FIG. 11. Reference numeral 17 designates such a liquid crystal panel receiving portion of the lamp reflector 3 as is folded at a right angle.

In FIG. 10, the liquid crystal panel 1 is fixed all over its one side by the liquid crystal panel receiving portion 14. As shown in FIG. 12, however, the liquid crystal panel 1 can be contacted partially with and fixed by at least one liquid crystal panel receiving portion 15.

In FIG. 10, on the other hand, there is provided the liquid crystal panel receiving portion 14 in which the folded-back portion folded back from the lamp reflector 3 is used as the contacted portion with the liquid crystal panel 1. As shown in FIG. 13, however, by forming the folded-back portion of the liquid crystal panel receiving portion 16 stepwise, the liquid crystal panel receiving portion 16 can retain the strength while framing narrowly.

In FIG. 10, on the other hand, there is provided the liquid crystal panel receiving portion 14 in which the folded-back portion folded back from the lamp reflector 3 is used as the contacted portion with the liquid crystal panel 1. As shown in FIG. 14, however, the folded-back portion of the liquid crystal panel receiving portion 17 can be folded at a right angle.

By providing the lamp reflector 3 with the liquid crystal panel receiving portion, according to Embodiment 5, the liquid crystal panel 1 can be fixed precisely in position while being narrowly framed.

Embodiment 6

Next, Embodiment 6 of the invention will be described with reference to the accompanying drawings.

Figure 15:
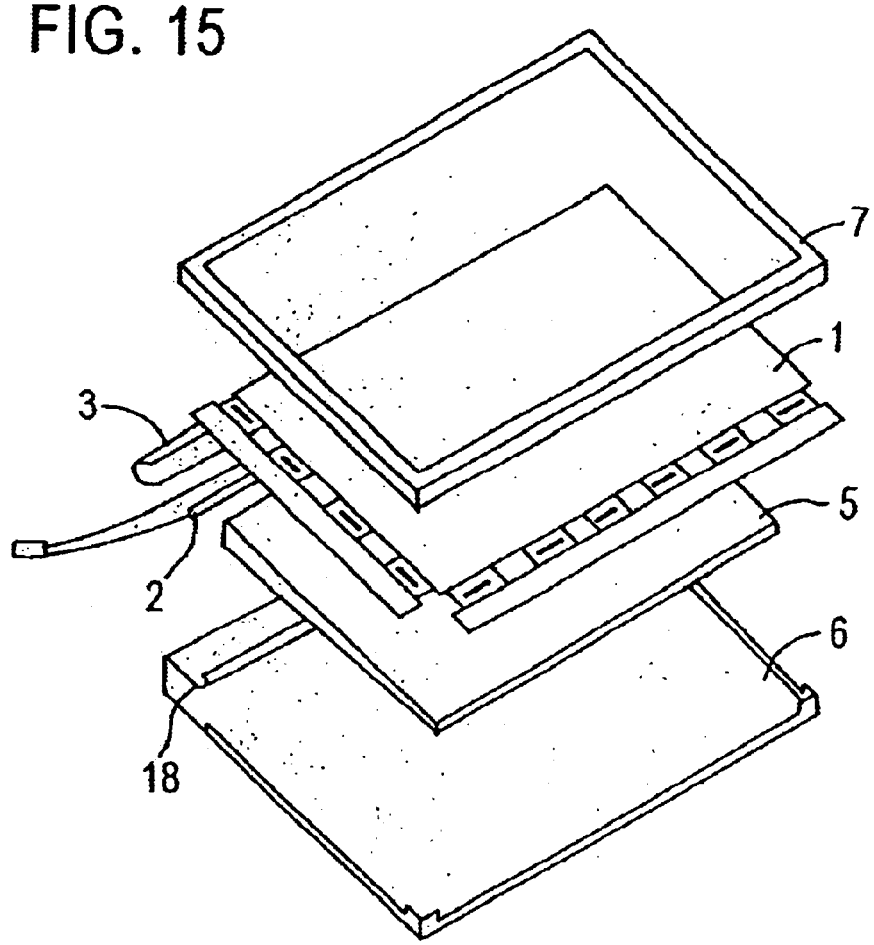
FIG. 15 is an exploded perspective view showing a liquid crystal display device according to Embodiment 6 of the invention.

FIG. 15 is an exploded perspective view showing a construction of a liquid crystal display device according to Embodiment 6 of the invention.

Figure 16:
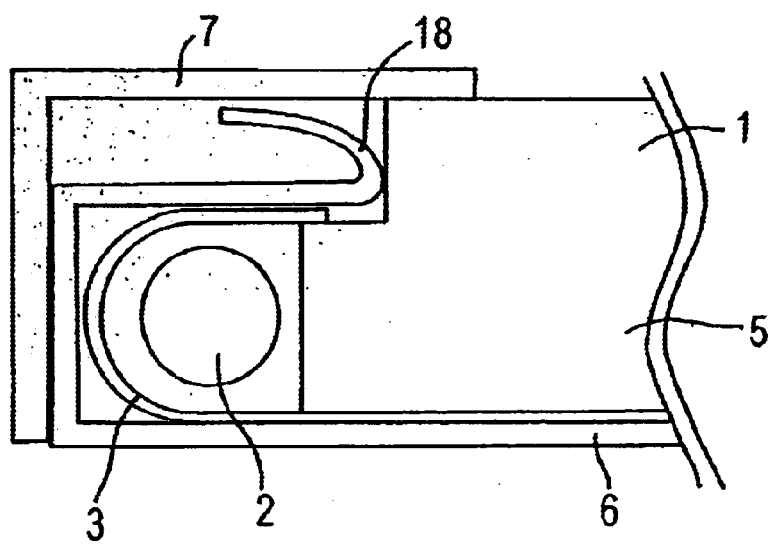
FIG. 16 is an enlarged view showing the liquid crystal display device according to Embodiment 6 of the invention.

FIG. 16 is an enlarged view of FIG. 15.

In FIGS. 15 and 16: reference numeral 1 designates a liquid crystal panel equipped with a printed board of a liquid crystal driving circuit; numeral 2 a lamp unit acting as a light source for the liquid crystal panel 1; numeral 3 a lamp reflector constructed to reflect the light coming from the lamp unit 2; numeral 5 designates an optical guide plate unit arranged on the back of the liquid crystal panel 1 for guiding the light coming from the lamp unit 2 to the whole face of the liquid crystal panel 1; numeral 6 a back frame for supporting the liquid crystal panel 1 together with the lamp reflector 3 and the optical guide plate unit 5; and numeral 7 a front frame for fixing the back frame 6. Numeral 18 designates a liquid crystal panel receiving portion in which a folded-back portion formed by folding back the back frame 6 is used as a contacted portion with the liquid crystal panel 1. This liquid crystal panel receiving portion 18 forms the positioning portion for the liquid crystal panel 1. Here, the folded-back portion of the liquid crystal panel receiving portion 18 may be folded back at an angle over 90 degrees and rounded at the contacted portion.

In the liquid crystal display device thus constructed, the liquid crystal panel 1 equipped with the liquid crystal driving printed board and the optical guide plate unit 5 are supported and fixed by the back frame 6. The lamp unit 2 is supported in a covered manner by the lamp reflector 3. This lamp reflector 3 is attached to the optical guide plate unit 5. The back frame 6 is provided with the liquid crystal panel receiving portion 18 in which the folded-back portion folded-back from the back frame 6 is used as the contacted portion with the liquid crystal panel 1.

In the liquid crystal display device shown in FIG. 16, the back frame 6 is provided with the liquid crystal panel receiving portion 18 so that the liquid crystal panel 1 can be fixed precisely in position while being narrowly framed.

Figure 17:
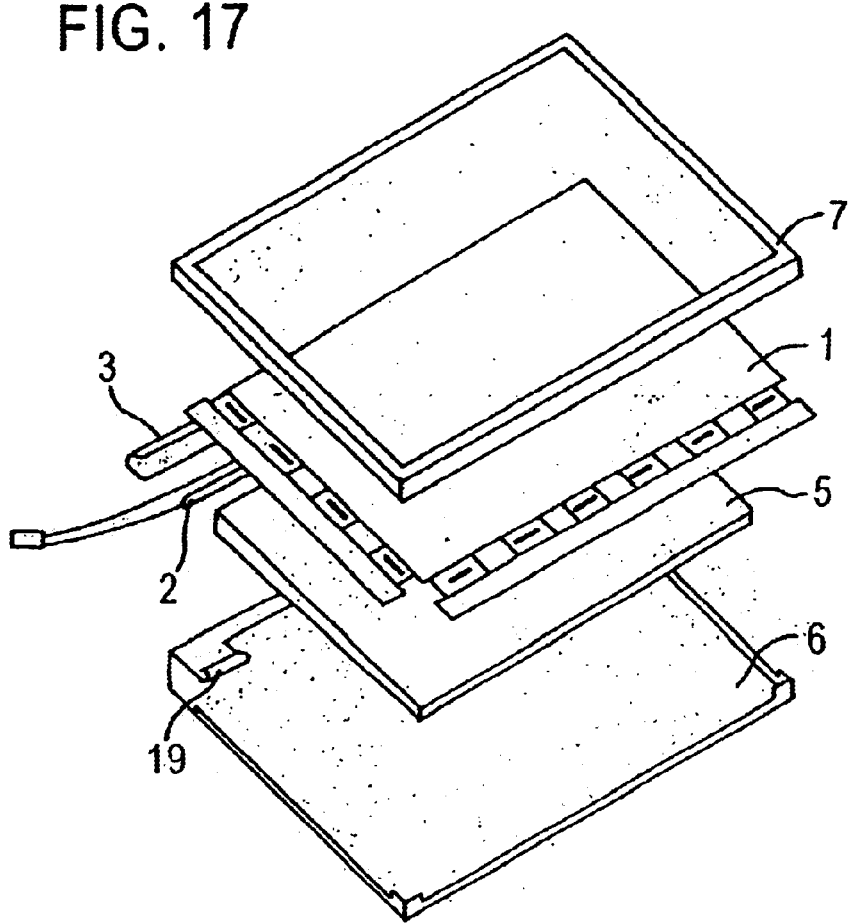
FIG. 17 is an exploded perspective view showing a liquid crystal display device according to Embodiment 6 of the invention.

FIG. 17 is an exploded perspective view showing a liquid crystal display device according to Embodiment 6 of the invention.

In FIG. 17, the components 1 to 3 and 5 to 7 are identical to those of FIG. 15. Reference numeral 19 designates a liquid crystal panel receiving portion which is so provided on the back frame 6 as is contacted in at least one portion with the liquid crystal panel 1.

Figure 18:
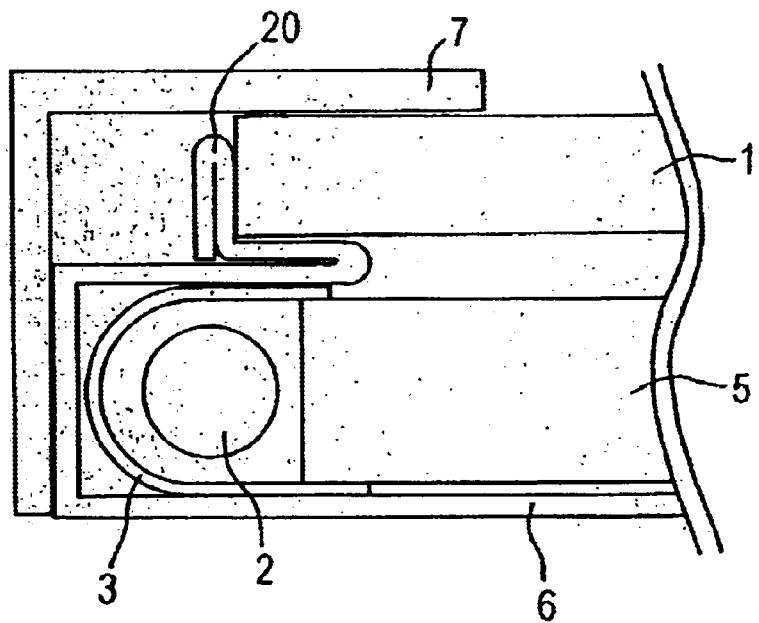
FIG. 18 is an enlarged view showing a liquid crystal display device according to Embodiment 6 of the invention.

FIG. 18 is an enlarged view showing a liquid crystal display device according to Embodiment 6 of the invention.

In FIG. 18, the components 1 to 3 and 5 to 7 are identical to those of FIG. 16. Reference numeral 20 designates such a liquid crystal panel receiving portion of the back frame 6 as has a stepwise folded-back portion.

Figure 19:
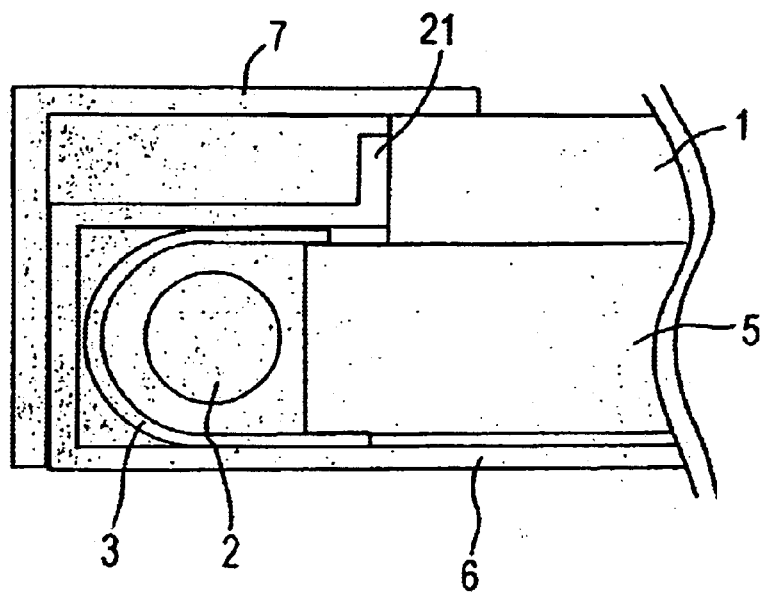
FIG. 19 is an enlarged view showing a liquid crystal display device according to Embodiment 6 of the invention.

FIG. 19 is an enlarged view showing a liquid crystal display device according to Embodiment 6 of the invention.

In FIG. 19, the components 1 to 3 and 5 to 7 are identical to those of FIG. 16. Reference numeral 21 designates such a liquid crystal panel receiving portion of the back frame 6 as is folded at a right angle.

In FIG. 15, the liquid crystal panel 1 is fixed all over its one side by the liquid crystal panel receiving portion 18. As shown in FIG. 17, however, the liquid crystal panel 1 can be contacted partially with and fixed by at least one liquid crystal panel receiving portion 19.

In FIG. 15, on the other hand, there is provided the liquid crystal panel receiving portion 18 in which the folded-back portion folded back from the back frame 6 is used as the contacted portion with the liquid crystal panel 1. As shown in FIG. 18, however, by forming the folded-back portion of the liquid crystal panel receiving portion 20 stepwise, the liquid crystal panel receiving portion 20 can retain the strength while framing narrowly.

In FIG. 15, on the other hand, there is provided the liquid crystal panel receiving portion 18 in which the folded-back portion folded back from the back frame 6 is used as the contacted portion with the liquid crystal panel 1. As shown in FIG. 19, however, the folded-back portion of the liquid crystal panel receiving portion 21 can be folded at a right angle.

By providing the back frame 6 with the liquid crystal panel receiving portion, according to Embodiment 6, the liquid crystal panel 1 can be fixed precisely in position while being narrowly framed.

According to a first aspect of the invention, there is provided a liquid crystal display device comprising: a liquid crystal panel for displaying an image; a lamp unit for providing a light source for the liquid crystal panel; an optical guide plate unit arranged on the back of the liquid crystal panel for irradiating the liquid crystal panel with a light outputted from the lamp unit; a lamp cover covering the lamp unit and having a contacted portion with the liquid crystal panel; and a pair of frames constructed for supporting the optical guide plate unit and the liquid crystal panel, wherein the contacted portion of the lamp cover with the liquid crystal panel is curved. As a result, the liquid crystal panel is not chipped at the assembling time.

On the other hand, the contacted portion of the lamp cover with the liquid crystal panel is arranged to position the liquid crystal panel. As a result, the liquid crystal panel can be precisely positioned.

On the other hand, the contacted portion of the lamp cover with the liquid crystal panel is curved by folding back the lamp cover. As a result, the liquid crystal panel is not chipped at the assembling time.

According to another aspect of the invention, there is provided a liquid crystal display device comprising: a liquid crystal panel for displaying an image; a lamp unit for providing a light source for the liquid crystal panel; an optical guide plate unit arranged on the back of the liquid crystal panel for irradiating the liquid crystal panel with a light outputted from the lamp unit; a back frame constructed to support the optical guide plate unit and to cover the lamp unit and having a contacted portion with the liquid crystal panel; and a front frame constructed to support the liquid crystal panel, wherein the contacted portion of the back frame with the liquid crystal panel is curved. As a result, the liquid crystal panel is not chipped at the assembling time.

On the other hand, the contacted portion of the back frame with the liquid crystal panel is arranged to position the liquid crystal panel. As a result, the liquid crystal panel can be precisely positioned.

According to still another aspect of the invention, there is provided a liquid crystal display device comprising: a liquid crystal panel for displaying an image; a lamp unit for providing a light source for the liquid crystal panel; an optical guide plate unit arranged on the back of the liquid crystal panel for irradiating the liquid crystal panel with a light outputted from the lamp unit; a lamp reflector arranged to reflect the light of the lamp unit a lamp cover covering the lamp reflector and having a contacted portion with the liquid crystal panel; and a pair of frames constructed for supporting the optical guide plate unit and the liquid crystal panel, wherein the contacted portion of the lamp cover with the liquid crystal panel is formed by folding back the lamp cover. As a result, the lamp cover can be provided with the contacted portion with the liquid crystal panel to fix the liquid crystal panel.

On the other hand, the contacted portion of the lamp cover with the liquid crystal panel is arranged to position the liquid crystal panel. As a result, the liquid crystal panel can be positioned by the contacted portion of the lamp cover.

On the other hand, the contacted portion of the lamp cover with the liquid crystal panel is curved. As a result, the liquid crystal panel can be fixed by the curved contacted portion.

Moreover, the contacted portion of the lamp cover with the liquid crystal panel is formed by folding back the lamp cover at an angle over 90 degrees. As a result, the liquid crystal panel can be fixed by the contacted portion folded back at 90 degrees or more.

On the other hand, the contacted portion of the lamp cover with the liquid crystal panel is formed by folding back the lamp cover stepwise. As a result, the liquid crystal panel can be fixed by the contacted portion which is folded back stepwise.

On the other hand, the contacted portion of the lamp cover with the liquid crystal panel is formed by folding the lamp cover at a right angle. As a result, the liquid crystal panel can be fixed by the contacted portion which is folded back at a right angle.

According to a further aspect of the invention, there is provided a liquid crystal display device comprising: a liquid crystal panel for displaying an image; a lamp unit for providing a light source for the liquid crystal panel; an optical guide plate unit arranged on the back of the liquid crystal panel for irradiating the liquid crystal panel with a light outputted from the lamp unit; a lamp reflector arranged to reflect the light of the lamp unit and having a contacted portion with the liquid crystal panel; and a pair of frames constructed for supporting the optical guide plate unit and the liquid crystal panel, wherein the contacted portion of the lamp reflector with the liquid crystal panel is formed by folding back the lamp reflector. As a result, the liquid crystal panel can be fixed by providing the lamp reflector with the contacted portion with the liquid crystal panel.

On the other hand, the contacted portion of the lamp reflector with the liquid crystal panel is arranged to position the liquid crystal panel. As a result, the liquid crystal panel can be positioned by the contacted portion of the lamp reflector.

On the other hand, the contacted portion of the lamp reflector with the liquid crystal panel is curved. As a result, the liquid crystal panel can be fixed by the curved contacted portion.

In addition, the contacted portion of the lamp reflector with the liquid crystal panel is formed by folding back the lamp reflector at an angle over 90 degrees. As a result, the liquid crystal panel can be fixed by the contacted portion which is folded back at 90 degrees or more.

On the other hand, the contacted portion of the lamp reflector with the liquid crystal panel is formed by folding back the lamp reflector stepwise. As a result, the liquid crystal panel can be fixed by the contacted portion which is folded back stepwise.

On the other hand, the contacted portion of the lamp reflector with the liquid crystal panel is formed by folding the lamp reflector at a right angle. As a result, the liquid crystal panel can be fixed by the contacted portion which is folded at a right angle.

According to a further aspect of the invention, there is provided a liquid crystal display device comprising: a liquid crystal panel for displaying an image; a lamp unit for providing a light source for the liquid crystal panel; an optical guide plate unit arranged on the back of the liquid crystal panel for irradiating the liquid crystal panel with a light outputted from the lamp unit; a back frame constructed to support the optical guide plate unit and to cover the lamp unit and having a contacted portion with the liquid crystal panel; and a front frame constructed to support the liquid crystal panel, wherein the contacted portion of the back frame with the liquid crystal panel is formed by folding back the back frame. As a result, the liquid crystal panel can be fixed by providing the back frame with the contacted portion with the liquid crystal panel.

On the other hand, the contacted portion of the back frame with the liquid crystal panel is arranged to position the liquid crystal panel. As a result, the liquid crystal panel can be positioned by the contacted portion of the back frame.

On the other hand, the contacted portion of the back frame with the liquid crystal panel is curved. As a result, the liquid crystal panel can be fixed by the curved contacted portion.

On the other hand, moreover, the contacted portion of the back frame with the liquid crystal panel is formed by folding back the back frame at an angle over 90 degrees. As a result, the liquid crystal panel can be fixed by the contacted portion which is folded back at 90 degrees or more.

On the other hand, the contacted portion of the back frame with the liquid crystal panel is formed by folding back the back frame stepwise. As a result, the liquid crystal panel can be fixed by the contacted portion which is folded back stepwise.

On the other hand, the contacted portion of the back frame with the liquid crystal panel is formed by folding the back frame at a right angle. As a result, the liquid crystal panel can be fixed by the contacted portion which is folded at a right angle.

Figure 20:
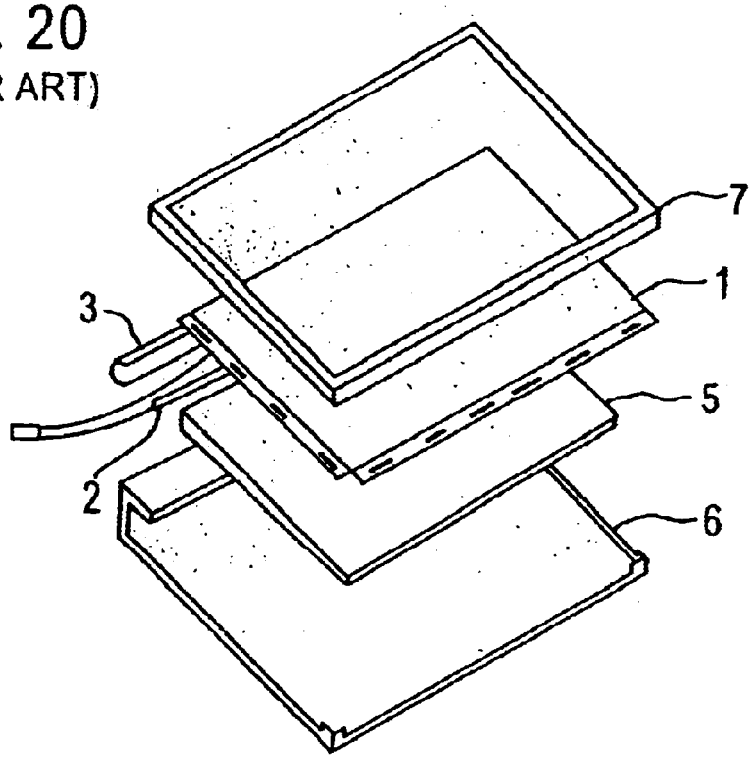
FIG. 20 is an exploded perspective view showing the construction of the liquid crystal display device of the prior art.

FIG. 1
1 liquid crystal panel
2 lamp unit
3 lamp reflector
4 lamp cover
5 optical guide plate unit
6 back frame
7 front frame
8 liquid crystal panel receiving portion
FIG. 3
9 liquid crystal panel receiving portion
FIG. 5
10 liquid crystal panel receiving portion
FIG. 7
11 liquid crystal panel receiving portion
FIG. 8
12 liquid crystal panel receiving portion
FIG. 9
13 liquid crystal panel receiving portion
FIG. 10
14 liquid crystal panel receiving portion
FIG. 12
15 liquid crystal panel receiving portion
FIG. 13
16 liquid crystal panel receiving portion
FIG. 14
17 liquid crystal panel receiving portion
FIG. 15
18 liquid crystal panel receiving portion
FIG. 17
19 liquid crystal panel receiving portion
FIG. 18
20 liquid crystal panel receiving portion
FIG. 19
21 liquid crystal panel receiving portion

What is claimed is:

1. A liquid crystal display device comprising:
   a liquid crystal panel for displaying an image;
   a lamp unit for providing a light source for said liquid crystal panel;
   an optical guide plate unit arranged on the back of said liquid crystal panel for irradiating said liquid crystal panel with a light outputted from said lamp unit;
   a back frame constructed to support said optical guide plate unit and to cover said lamp unit and having a contacted portion with said liquid crystal panel; and
   a front frame constructed to support said liquid crystal panel,
   wherein the contacted portion of said back frame with said liquid crystal panel is curved.

2. A liquid crystal display device according to claim 1, wherein the contacted portion of said back frame with said liquid crystal panel is arranged to position said liquid crystal panel.

3. A liquid crystal display device according to claim 1, wherein said contacted portion contacts a side surface of said liquid crystal panel.

4. A liquid crystal display device comprising:
   a liquid crystal panel for displaying an image;
   a lamp unit for providing a light source for said liquid crystal panel;
   an optical guide plate unit arranged on the back of said liquid crystal panel for irradiating said liquid crystal panel with a light outputted from said lamp unit;
   a back frame constructed to support said optical guide plate unit and to cover said lamp unit and having a contacted portion with a side surface of said liquid crystal panel; and a front frame constructed to support said liquid crystal panel, wherein the contacted portion of said back frame with said liquid crystal panel is formed by folding back said back frame.

5. A liquid crystal display device according to claim 4, wherein the contacted portion of said back frame with said liquid crystal panel is arranged to position said liquid crystal panel.

6. A liquid crystal display device according to claim 4, wherein the contacted portion of said back frame with said liquid crystal panel is curved.

7. A liquid crystal display device according to claim 4, wherein the contacted portion of said back frame with said liquid crystal panel is formed by folding back said back frame at an angle over 90 degrees.

8. A liquid crystal display device according to claim 4, wherein the contacted portion of said back frame with said liquid crystal panel is formed by folding back said back frame stepwise.

9. A liquid crystal display device according to claim 4, wherein the contacted portion of said back frame with said liquid crystal panel is formed by folding said back frame at a right angle.

10. A liquid crystal display device according to claim 4, wherein said front frame is coupled to a surface of said back frame.

11. A liquid crystal display device according to claim 4, wherein said front frame is coupled to a surface of said back frame and a surface of said liquid crystal panel.

12. A liquid crystal display device according to claim 4, wherein said back frame includes a top wall and a bottom wall having said lamp unit positioned therebetween, and a side wall connecting the top wall and bottom wall, wherein said contacted portion is formed by folding back said top wall.

* * * * *

UNITED STATES PATENT AND TRADEMARK OFFICE
CERTIFICATE OF CORRECTION

PATENT NO.   : 6,721,021 B2                                              Page 1 of 1
DATED        : April 13, 2004
INVENTOR(S)  : Takuya Sakamoto et al.

It is certified that error appears in the above-identified patent and that said Letters Patent is hereby corrected as shown below:

Drawings,
Replace "Fig. 16" on Sheet 9 of 11 with corrected Fig. 16 attached.

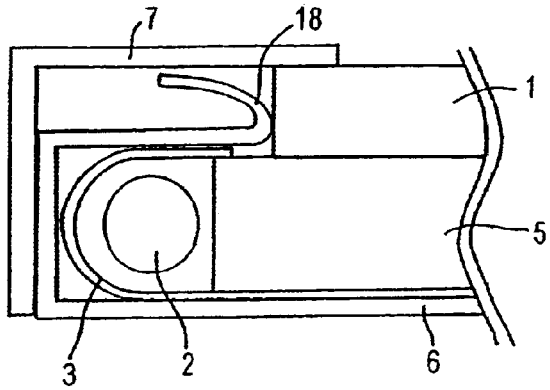

Signed and Sealed this

Thirteenth Day of June, 2006

JON W. DUDAS
*Director of the United States Patent and Trademark Office*